June 16, 1931.  H. E. MARTIN  1,809,858
MACHINE TOOL
Filed June 21, 1928   2 Sheets-Sheet 1
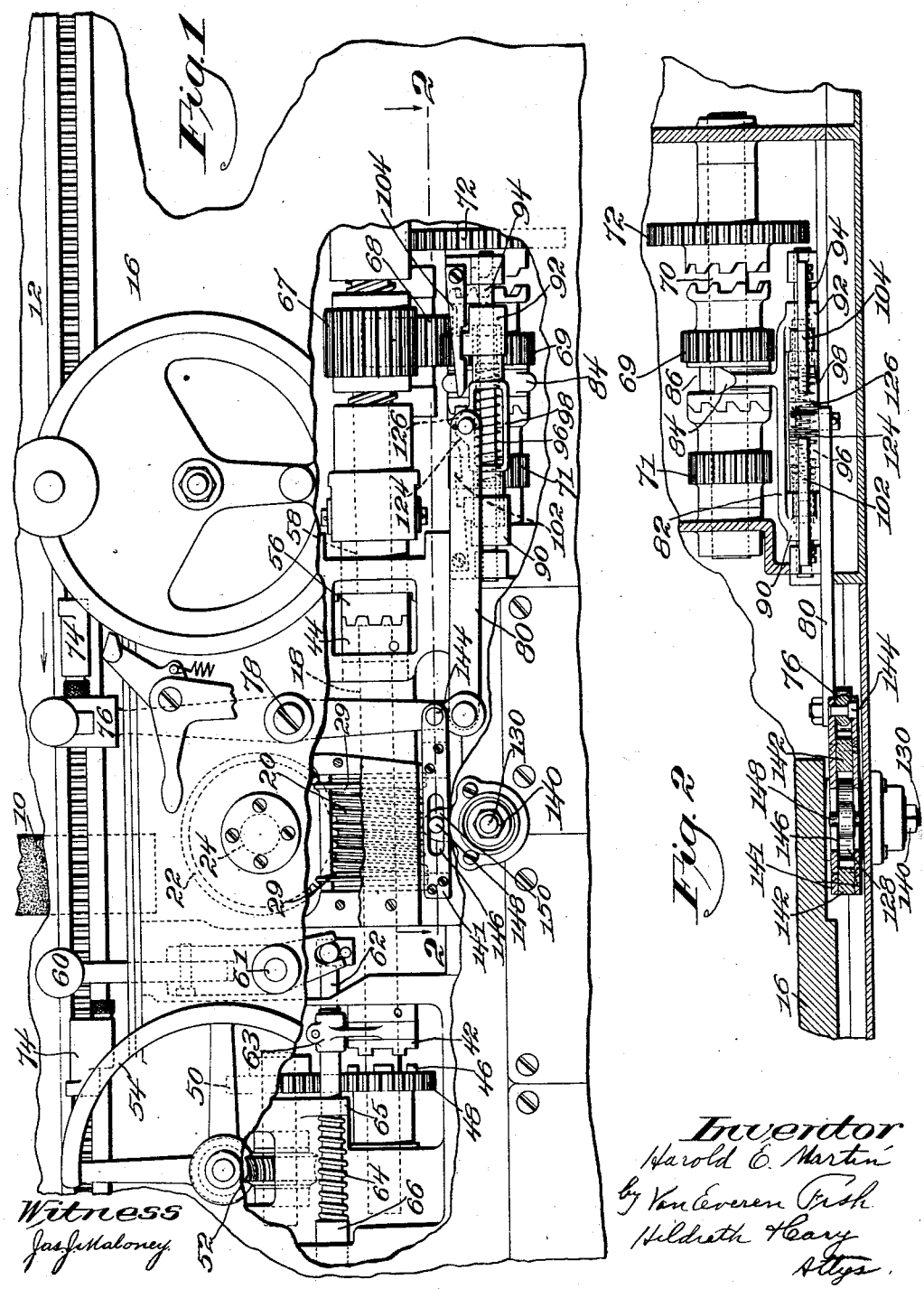
Inventor
Harold E. Martin
by Van Everen Fish
Hildreth & Cary
Attys.
Witness
Jas. J. Maloney June 16, 1931. H. E. MARTIN 1,809,858
MACHINE TOOL
Filed June 21, 1928 2 Sheets-Sheet 2

Witness
Jas. J. Maloney

Inventor
Harold E. Martin
by Van Everen Fish
Hildreth & Cary
Attys.

Patented June 16, 1931

1,809,858

UNITED STATES PATENT OFFICE

HAROLD E. MARTIN, OF NORTH PROVIDENCE, RHODE ISLAND, ASSIGNOR TO BROWN AND SHARPE MANUFACTURING COMPANY, A CORPORATION OF RHODE ISLAND

MACHINE TOOL

Application filed June 21, 1928. Serial No. 287,135.

The present invention relates to machine tools and more particularly to a checking mechanism adapted to arrest the movement of a reciprocating table upon reversal of the direction of the drive.

As herein disclosed, the preferred embodiment of the invention comprises a grinding machine which is provided with a grinding wheel and with a work supporting table which is given a reciprocatory movement to move the work back and forth across the operating face of the wheel.

The primary object of the invention is to provide a novel and improved checking device for arresting the movement of a reciprocating table in each direction which will be simple in construction and operation and more efficient than devices of this description previously developed.

With this object in view, a feature of the invention consists in the provision of a checking mechanism which is rendered operative to cushion the stopping of the table after the reversing mechanism has been thrown into operation to reverse the direction of the table drive.

Figure 3:
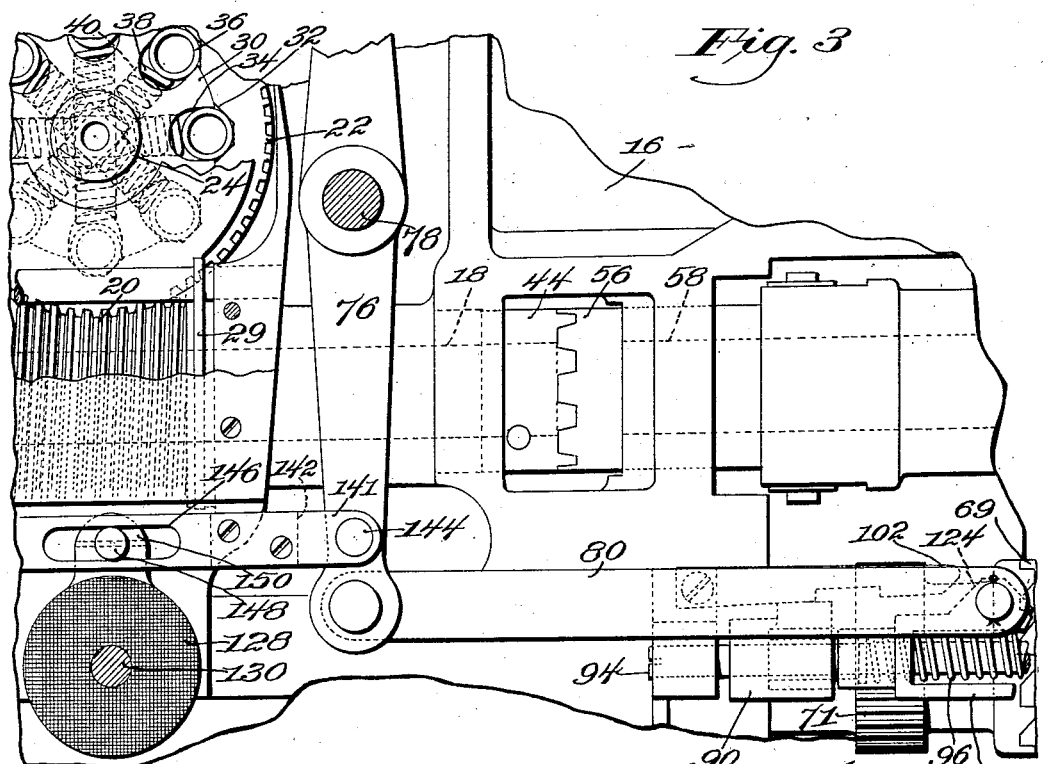
Figure 4:
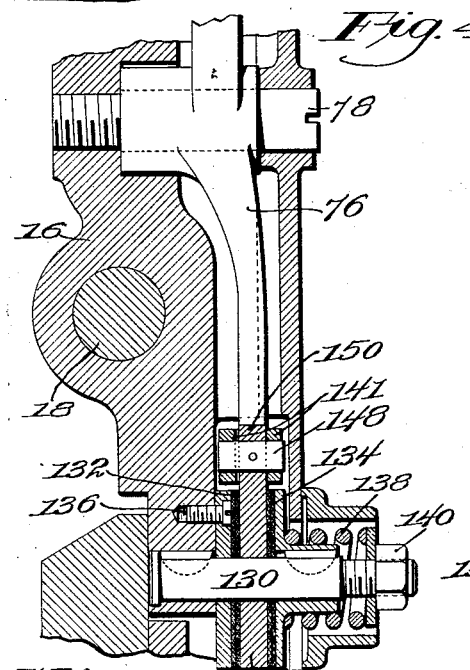
Figure 5:
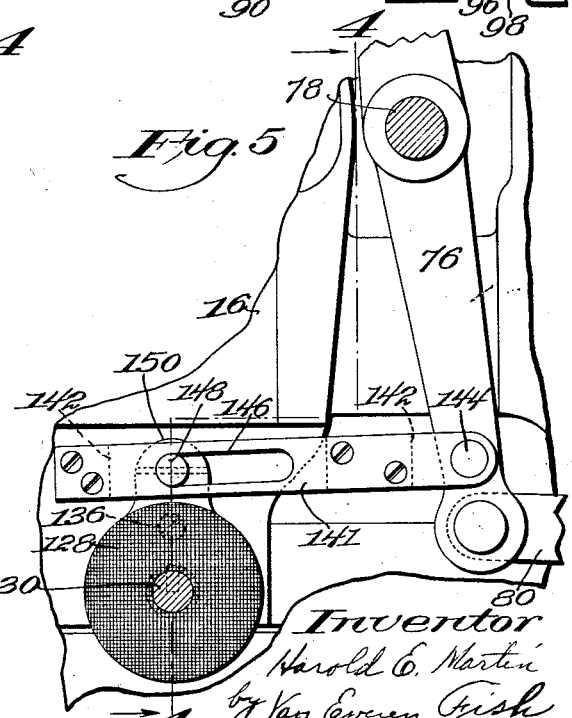

The several features of the invention consist also in the devices, combinations, and arrangement of parts hereinafter described and claimed and together with the advantages to be obtained thereby, should be readily understood by one skilled in the art from the following description taken in connection with the accompanying drawings, in which Fig. 1 is a view in front elevation of a grinding machine embodying the several features of the invention, only so much of the machine being illustrated as necessary to show the connection of the invention therewith; Fig. 2 is a detail plan view partly in section taken on the line 2—2 of Fig. 1; Fig. 3 is an enlarged detail view in front elevation with parts broken away to illustrate particularly the checking mechanism and portions of the table drive; Fig. 4 is a detail sectional view taken on the line 4—4 of Fig. 5; and Fig. 5 is a detail view of certain of the parts shown in position as the checking mechanism is rendered operative upon the reversal of the table drive.

For a complete disclosure of the grinding machine herein disclosed, reference may be had to the pending application of Maxwell I. Mathewson for grinding machines, Serial No. 206,917, filed July 19, 1927.

In this machine a power drive is provided for the table including a change speed and reversing mechanism which is adapted to drive the table at a number of different speeds. The table is driven at a nearly constant speed to the end of its travel when it is abruptly stopped and abruptly started on its return travel. To this end, the table is driven through a worm and worm gear which form an irreversible drive, so that when the worm is stopped, the table is locked against further movement. The shock caused by the momentum of the heavy table when the worm is stopped is taken up to some extent through a yielding connection provided between the worm gear and the table. In order, however, to prevent undue strain on the worm and gear connections when the heavy table is driven at relatively high speeds, it is necessary to provide additional means for braking the table at the end of the table travel in each direction. The machine is provided with a load and fire mechanism for reversing the table drive, controlled through a reversing lever and adjustable dogs mounted on the work supporting table, and as originally constructed the loading spring of this mechanism was utilized as a table braking means, being made sufficiently heavy to arrest the continued movement of the table as the reversing lever was moved to one side or the other to reverse the direction of the drive. It was found, however, in operation, that this construction was attended with certain disadvantages. The pressure was exerted by the loading spring largely before the operation of the reversing mechanism, thus causing a hard spot in the operation of the machine, particularly when operated by hand, and the energy stored by the spring also tended to cause the table to overrun after the reversal of the drive as the reversing lever returned to its central position.

In order to eliminate these disadvantages and to provide a particularly useful and efficient mechanism, the strength of the loading spring in the present construction has been greatly reduced and a checking device has been provided which acts on the reversing lever only after the reversing mechanism has been thrown into operation and brings the table to a stop in as short a distance as is practicable before it is driven in the opposite direction.

Referring more specifically to the drawings, the grinding wheel is indicated at 10 and the work supporting table at 12 mounted to reciprocate on ways on the machine frame indicated at 16. As in the machine of the application hereinbefore referred to, the table may be driven by power from the change speed and reversing mechanism hereinafter described through connections which comprise a shaft 18 on which is splined a worm 20 which in turn meshes with a worm gear 22 connected to a cross shaft 24 upon which is mounted a gear which engages with a rack formed on the under side of the table. The worm 20 and the worm gear 22 form a substantially irreversible drive. Consequently, when the shaft 18 and the worm 20 are stopped, the table is brought to an abrupt halt. In order to overcome any inertia in the mechanism for driving the worm when the power is thrown off and any movement of the worm 20 due to the inertia of the table, a friction or drag device is provided which tends to bring the worm 20 and the shaft to an immediate stop. This device comprises two stationary friction disks 29 which are adapted to maintain a frictional contact with each end of the worm 20.

Also as in the machine of the application referred to, the shock of the sudden starting and stopping of the table is taken up to some extent by means of a yielding connection or shockabsorber between the worm gear 22 and the cross shaft 24 from which the table is driven. The worm gear 22 is loosely mounted to turn on an enlarged hub or annular disk 30 on the cross shaft 24 and is provided on its inner periphery with a series of V-shaped grooves 32 which register with a series of smaller grooves 34 formed on the outer periphery of the hub 30. A series of rollers 36 are mounted in the grooves and are pressed yieldingly outwards into the slots by the compression springs 38 mounted in radially disposed recesses 40 on the hub 30. The pressure of the springs is sufficient during the continuous operation of the table drive to hold the rollers 36 centered in the V-shaped grooves 32 to maintain the worm gear 22 fixed with relation to its hub 30. However, under the greater strain of starting and stopping the table, the rollers will be forced in by the V-shaped walls of the grooves 32 permitting the worm gear 22 to give slightly with relation to its hub 30 after which the parts will return again to their normal position under the pressure of the springs 38.

In order to permit the table to be driven by power or by hand as desired, the shaft 18 is provided at each end with clutch members, indicated respectively at 42 and 44, and is mounted for endwise movement to engage one or the other, the construction being the same as in the machine of the application referred to. As viewed in Fig. 1, when the shaft 18 is moved to the left, the clutch teeth 42 are adapted to engage with a corresponding clutch member 46 which is in turn driven through the intermeshing gears 48 and 50 and the worm and pinion indicated at 52 from the hand wheel 54. When the shaft 18 is moved to the right, as viewed in Fig. 1, the clutch teeth 44 are brought into contact with a clutch member 56 which is formed on the end of a shaft 58 and constitutes a part of the power drive. The movement of the clutch shaft 18 to throw the power or the hand feed into operation is controlled by means of a hand lever 60 which is pivotally mounted at 61 on the front of the machine and at its lower end is connected to impart a lengthwise movement to a shaft 62 which in turn acts through an arm 63 to move the clutch shaft 18. A compression spring 64 coiled about the shaft 62 between a bearing 65 and a collar 66 on the shaft tends to hold the shaft 62 and the clutch shaft 18 normally to the left, as viewed in Fig. 1 with the clutch members 46 and 42 for the hand feed in operative engagement.

The shaft 58 constituting part of the power drive is driven by means of a gear 67 which is threaded for a limited movement on the shaft 58 to provide a dwell at the end of the table travel in each direction. The gear 67 is driven through an idler gear 68 which in turn meshes with a gear clutch member 69 which comprises a part of the reversing mechanism of the machine. The gear clutch member 69 is loosely mounted on a shaft 70 between the gears 71 and 72 which are loosely mounted on the shaft 70 and driven in opposite directions by the change speed mechanism of the machine.

The mechanism for reversing the table is automatically operated at predetermined points in the travel of the table in each direction by adjustable dogs 74 carried on the table which cooperate with a reversing lever 76 mounted at 78 on the stationary frame. The lever is connected at its lower end to the sliding bar 80 which is in turn connected to the load and fire mechanism which operates the reversing clutch 69. This load and fire mechanism is the same as that of the machine of the application referred to and comprises a spring 96 which is compressed by the movement of the reversing lever in either direction when engaged by a dog 74 on the table and is then released to operate the reversing clutch 69 rapidly and efficiently to reverse the direction of drive. The clutch shifter of this mechanism is in the form of a frame 82 which carries a yoke 84 engaging a groove 86 in the clutch and at its ends is provided with the hubs 90 and 92 mounted to slide on the fixed rod 94. The compression spring 96 which surrounds the rod 94 is interposed between two sleeves which are mounted to slide freely on the rod and engage the inner sides of the hubs 90 and 92. The spring is compressed and thus rendered active to operate the clutch shifter by a sliding casing 98 which is moved in one direction or the other by the reversing lever acting through the link 80. The clutch shifter 82 is locked in position as the spring is compressed by the engagement of one of two latches 102 and 104 which are arranged to engage corresponding shoulders on the clutch shifter frame 82. The latches are operated to release the spring, after it has been sufficiently compressed to effect a sudden shifting of the clutch, by the cam surfaces 124 and 126 formed on the sliding casing 98 and arranged to engage the inner ends of the latches 102 and 104. For a more detailed description of this mechanism for shifting the reversing clutch, reference may be had to the patent to H. E. Townsend, No. 1,129,762, dated February 23, 1915.

As has been stated with the old construction a heavy spring was employed in the load and fire mechanism which was compressed by the movement of the reversing lever in either direction in engagement with the reversing dog on the table and acted to brake the table as the reversing clutch was thrown into operation to drive the table in the opposite direction. The cushioning effect was further increased by means of the yielding connection which is interposed in the table drive between the worm gear 22 and the table, and by the dwell mechanism which acts to introduce a pause at each end of the table travel before the driving mechanism is rendered operative to drive the table in the opposite direction. The principal disadvantage of this construction rested in the fact that when the reversing mechanism was operated by hand, it was necessary for the operator to force the reversing lever over against the pressure of this heavy spring. Moreover, because of the yielding connections provided in the table drive, the energy stored in the spring tended to cause the table to overrun its driving connections as the table was started in the opposite direction. The present construction retains the advantages of the yielding connections between the worm gear and the table and the dwell mechanism while at the same time the strength of the spring in the load and fire mechanism is reduced to facilitate materially the manual operation of the reversing mechanism by the operator and also to reduce the back lash caused by the releasing of the pent-up energy in the spring as the table is started in the opposite direction.

As herein disclosed, in order to stop the work supporting table at the end of its travel in each direction without subjecting the worm drive to an excessive strain, particularly at high speeds, a checking mechanism is provided which acts independently of the driving mechanism to bring the table to a stop upon reversal of the direction of the drive. This mechanism comprises a friction disk 128 which is loosely mounted on a fixed stud 130 rigidly mounted in the machine frame and is adapted to rotate between two stationary friction disks 132 and 134, the disk 132 being fastened by means of a screw 136 to the machine frame and the disk 134 being rigidly keyed to the stud 130. Both stationary disks 132 and 134 have friction facings to cooperate with the corresponding faces of the friction disk 128. In order to permit an adjustment of the amount of frictional resistance offered by the friction disk 128 to stop the table, the outer stationary friction disk 134 is held yieldingly in engagement with the disk 128 by means of a compression spring 138 which is coiled about the stud 130 and is interposed between the stationary disk 134 and a nut 140 threaded onto the end of the stud 130. The amount of the tension may readily be regulated by turning up the nut.

Connections are provided for causing the checking mechanism above described to act on the reversing lever 76 to arrest the continued movement of the table only after the load and fire mechanism has been actuated to reverse the direction of the table drive. These connections comprise a frame composed of two parallel bars 141 which are connected by means of two blocks 142 and are secured at one end by means of a pin 144 to the lower end of the reversing lever 76. A slot 146 is formed in each of the bars 141 to receive a pin 148 which is mounted in a projecting portion 150 of the friction disk 128. With this arrangement of the parts, the reversing lever 76 is permitted to move for a considerable distance to operate the load and fire mechanism as the table approaches the end of its travel without resistance from the checking mechanism, due to the lost motion provided by the pin and slot connection above described. At this point the pin 148 will engage the ends of the slots 146 so that the further movement of the reversing lever 76 and the table 12 is opposed by the friction plate 128. The amount of the resistance applied by the friction plate 128 is regulated to bring the table to a stop before the worm drive becomes effective through the yielding connections above described to drive the table in the reverse direction. At the opposite end of the table travel the reversing lever is engaged by the corresponding dog and is swung back acting first to operate the load and fire mechanism and then to stop the table against the friction plate 128 so that the plate is oscillated back and forth within narrow limits at each reversal of the direction of the table feed.

The nature and scope of the invention having been indicated and the preferred embodiment thereof in a grinding machine having been described, what is claimed is:

1. In a machine tool the combination with a stationary bed and a movable table of means including driving connections for driving the table, a reversing mechanism for automatically reversing the direction of the table drive, and a checking mechanism rendered operative by the reversing mechanism and acting independently of the said driving connections to cushion the stopping of the table.

2. In a machine tool the combination with a stationary bed and a movable table of a power drive including driving connections for the table, a reversing lever, dogs on the table adapted to engage with the reversing lever, means actuated by the lever for reversing the direction of the table drive, and a checking mechanism rendered operative thereafter and acting independently of the table driving connections to arrest the further movement of the lever and the table.

3. In a machine tool the combination with a stationary bed and a movable table of a power drive for the table, dogs on the table adapted to engage with the reversing lever, means actuated by the lever for reversing the direction of the table drive, and a checking mechanism acting through the reversing lever after the reversing mechanism is thrown into operation to stop the table.

4. In a machine tool the combination with a stationary bed and a movable table of means for driving the table, a reversing lever, dogs on the table adapted to engage with the reversing lever, means actuated by the lever for reversing the direction of the table drive, and a checking mechanism including a lost motion connection with the reversing lever rendered operative to cushion the stopping of the table upon the actuation of the reversing lever to reverse the direction of drive.

5. A grinding machine having, in combination with a grinding wheel, a longitudinally movable work table, a power drive for the table, a reversing lever, a load and fire mechanism for reversing the direction of feed of the table actuated through the reversing lever by the continued movement of the table, and a checking mechanism connected to the reversing lever rendered operative to resist the further movement of the table in the same direction.

6. A grinding machine having, in combination, a grinding wheel, a longitudinally movable work table, a power drive for the table, a reversing lever, a reversing mechanism for reversing the direction of feed of the table actuated through the reversing lever by the continued movement of the table, and a checking mechanism rendered operative to arrest further movement of the reversing lever and the table.

7. A grinding machine having, in combination, a grinding wheel, a longitudinally movable work table, a power drive for the table, a reversing mechanism for imparting a reciprocating movement to the table from the power drive, a checking mechanism, and a reversing lever acting when thrown into operation first to render operative the reversing mechanism and thereafter to render the checking mechanism operative to arrest the continued movement of the table.

8. A grinding machine having, in combination, a grinding wheel, a longitudinally movable work table, a power drive for the table, a reversing lever, dogs on the table adapted to engage with the reversing lever, means actuated by the lever for reversing the direction of the table drive, a checking mechanism for arresting the continued movement of the reversing lever in either direction, and means for delaying action of the checking mechanism until after the reversing means have been rendered operative.

9. A grinding machine having, in combination with a grinding wheel, a longitudinally movable work table, a power drive for the table, a reversing lever, dogs on the table adapted to engage with the reversing lever, means actuated by the lever for reversing the direction of the table drive, a checking mechanism for arresting the continued movement of the reversing lever in either direction, and connections between the checking mechanism and the reversing lever adapted to permit a limited free movement of the lever in each direction.

10. A grinding machine having, in combination with a grinding wheel, a longitudinally movable work table, a worm and worm gear for driving the table, a reversing lever, dogs on the table adapted to engage with the reversing lever, means actuated by the lever for reversing the direction of the table drive, yielding connections between the worm gear and table, and a checking mechanism connected to the reversing lever for arresting the continued movement of the reversing lever.

11. A grinding machine having, in combination with a grinding wheel, a longitudinally movable work table, a work and worm gear for driving the table, a reversing lever, dogs on the table adapted to engage with the reversing lever, a reversing clutch actuated by the lever for reversing the direction of the table drive, and a checking mechanism rendered operative after the operation of the reversing clutch to arrest the continued movement of the reversing lever and table.

12. A grinding machine having, in combination with a grinding wheel, a longitudinally movable work table, a power drive for the table, a reversing lever, dogs on the table adapted to engage with the reversing lever, means actuated by the lever for reversing the direction of the table drive, and a checking mechanism comprising a friction disk and a link having a pin and slot connection with the friction disk to resist the movement of the reversing lever only after the means for reversing the table drive have been thrown into operation.

13. A grinding machine having, in combination with a grinding wheel, a longitudinally movable work table, a power drive for the table, a reversing lever, dogs on the table adapted to engage with the reversing lever, means actuated by the lever for reversing the direction of the table drive, and a checking mechanism for arresting the continued movement of the reversing lever in either direction comprising cooperating friction disks, spring means for determining the tension of the friction disks, and a link provided with pin and slot connections for actuating the checking mechanism from the reversing lever.

14. In a machine tool the combination with a stationary bed and a movable table of means for driving the table, a reversing mechanism for automatically reversing the direction of the table drive, a checking mechanism rendered operative by the reversing mechanism and acting independently thereof to cushion the stopping of the table, and means for adjusting the checking mechanism to regulate the cushioning effect.

In testimony whereof I have signed my name to this specification.

HAROLD E. MARTIN.